United States Patent
Li et al.

(10) Patent No.: US 11,849,447 B2
(45) Date of Patent: Dec. 19, 2023

(54) PDSCH RATE MATCHING AROUND SSB FOR NR UNLICENSED SPECTRUM OPERATION

(71) Applicant: Intel Corporation, Santa Clara, CA (US)

(72) Inventors: Yingyang Li, Beijing (CN); Gang Xiong, Beaverton, OR (US); Bishwarup Mondal, San Ramon, CA (US); Dae Won Lee, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 243 days.

(21) Appl. No.: 17/145,639

(22) Filed: Jan. 11, 2021

(65) Prior Publication Data

US 2021/0136800 A1    May 6, 2021

Related U.S. Application Data

(60) Provisional application No. 62/960,533, filed on Jan. 13, 2020.

(51) Int. Cl.
*H04W 72/1273* (2023.01)
*H04W 72/044* (2023.01)
*H04W 48/10* (2009.01)
*H04W 72/30* (2023.01)

(52) U.S. Cl.
CPC ....... *H04W 72/1273* (2013.01); *H04W 48/10* (2013.01); *H04W 72/044* (2013.01); *H04W 72/30* (2023.01)

(58) Field of Classification Search
CPC ............. H04W 72/1273; H04W 72/30; H04W 72/044; H04W 48/10
See application file for complete search history.

(56) References Cited

U.S. PATENT DOCUMENTS

| | | | |
|---|---|---|---|
| 2019/0037509 A1* | 1/2019 | Li | H04L 27/0006 |
| 2019/0110314 A1* | 4/2019 | Abedini | H04W 72/53 |
| 2019/0246410 A1* | 8/2019 | Zhang | H04W 72/0446 |

(Continued)

*Primary Examiner* — Ajay Cattungal
(74) *Attorney, Agent, or Firm* — Schwegman Lundberg & Woessner, P.A

(57) ABSTRACT

A generation-Node B (gNB) configured for unlicensed spectrum operation above 52.6 GHz in a fifth-generation new-radio (NR) system (5GS) may encode a parameter (e.g., ssb-PositionsInBurst) for transmission to a UE (e.g., in the SIM or UE specific RRC signalling). The parameter may indicate candidate positions of synchronization signal blocks (SSBs) within a discovery reference signal (DRS) measurement timing configuration (DMTC) transmission window within slots of a system frame (SFN). During the DMTC window, the gNB may perform a LBT procedure on an unlicensed carrier of the unlicensed spectrum to determine if the unlicensed carrier is available. When the LBT is successful (i.e., the unlicensed carrier is available), the gNB may encode a discovery reference signal (DRS) for transmission on the unlicensed carrier. The DRS may include one or more of the SSBs transmitted during the candidate positions that fall within the DRS. The gNB may perform rate matching around the SSBs for a scheduled PDSCH based on the indicated parameter and transmit the rate-matched PDSCH.

19 Claims, 4 Drawing Sheets

(56) References Cited

U.S. PATENT DOCUMENTS

| | | | |
|---|---|---|---|
| 2019/0261315 A1* | 8/2019 | Zhang | H04L 1/0001 |
| 2019/0306832 A1* | 10/2019 | Si | H04W 16/14 |
| 2019/0363843 A1* | 11/2019 | Gordaychik | H04L 1/08 |
| 2020/0015236 A1* | 1/2020 | Kung | H04B 7/04 |
| 2020/0076488 A1* | 3/2020 | Brunel | H04B 7/063 |
| 2020/0154449 A1* | 5/2020 | Akkarakaran | H04L 5/0064 |
| 2020/0229104 A1* | 7/2020 | MolavianJazi | H04W 52/54 |
| 2020/0235791 A1* | 7/2020 | Raghavan | H04B 7/0456 |
| 2021/0076349 A1* | 3/2021 | Ioffe | H04W 64/006 |
| 2023/0070204 A1* | 3/2023 | Kim | H04W 74/0833 |

* cited by examiner

PDSCH RATE MATCHING AROUND SSB FOR NR UNLICENSED SPECTRUM OPERATION

PRIORITY CLAIM

This application claims priority under 35 USC 119(e) to U.S. Provisional Patent Application Ser. No. 62/960,533, filed Jan. 13, 2020 [reference number AC7464-Z] which is incorporated herein by reference in its entirety.

TECHNICAL FIELD

Embodiments pertain to wireless communications. Some embodiments relate to fifth generation (5G) new radio (NR) systems (5GS). Some embodiments relate to rate matching. Some embodiments relate to unlicensed spectrum operations.

BACKGROUND

One issue with unlicensed spectrum operation in fifth generation (5G) new radio (NR) systems (5GS) is the reliability of synchronization signal block (SSB) transmissions due to listen before talk (LBT).

DETAILED DESCRIPTION

Figure 1A:
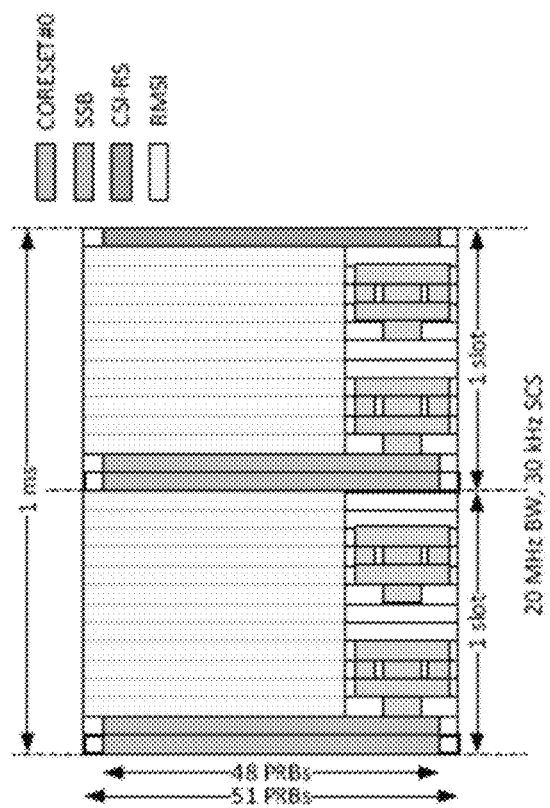
FIG. 1A illustrates an example discovery reference signal (DRS) transmission in accordance with some embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments, Embodiments set forth in the claims encompass all available equivalents of those claims.

Embodiments disclosed herein relate to physical downlink shared channel (PDSCH) rate matching around SSBs for new radio (NR) unlicensed operation. Some embodiments are directed to a generation node B (gNB) configured for operation in a fifth-generation new-radio (NR) system (5GS). In these embodiments, for unlicensed spectrum operation above 52.6 GHz, the gNB may be configured to encode a parameter (e.g., ssb-PositionsInBurst) for transmission to a UE (e.g., in the SIB1 or UE specific RRC signalling). The parameter may indicate candidate positions of synchronization signal blocks (SSBs) within a discovery reference signal (DRS) measurement timing configuration (DMTC) transmission window within slots of a system frame (SFN). During the DMTC window, the gNB may perform a LBT procedure on an unlicensed carrier of the unlicensed spectrum to determine if the unlicensed carrier is available. When the LBT is successful (i.e., the unlicensed carrier is available), the gNB may encode a discovery reference signal (DRS) for transmission on the unlicensed carrier. The DRS may include one or more of the SSBs transmitted during the candidate positions that fall within the DRS (i.e., not all candidate positions, only the candidate positions that are within the DRS that is being transmitted). In these embodiments, the gNB may perform rate matching around the SSBs for a scheduled PDSCH based on the indicated parameter and transmit the rate-matched PDSCH. These embodiments are described in more detail below.

In some embodiments, the SSBs include a primary synchronization signal (PSS), a secondary synchronization signal (SSS) and a physical broadcast channel (PBCH). The PSS, the SSS and the PBCH may allow a user equipment (UE) to detect the SSB for synchronization with the gNB and determine parameters for SSB time index determination. In these embodiments, the parameters for SSB time index determination include: a candidate SSB index (t); a cycle index (c); a PBCH-DMRS index (s); a beam index (b); and a number of SSBs used for QCL derivation (Q).

In these embodiments, the cyclic index (c) and the number of SSBs used for quasi-co location (QCL) derivation (Q) may be carried in the PBCH. In these embodiments, the UE detects an SSB, determines the PBCH-DMRS index (s) from the PBCH. From the master information block (MIB) in the PBCH, the UE may determine the cycle index (c) and the number of SSBs used for QCL derivation (Q), The candidate SSB index (t) may be determined from c and s (e.g., t=8*c+s), and beam index (b) may be determined from s and Q (e.g., b=s mod Q). These embodiments are described in more detail below.

In some embodiments, when the LET is not successful (i.e., the unlicensed carrier is not available), the gNB may refrain from transmitting the DRS on the unlicensed carrier within the DMTC window. In these embodiments, the UE will still look for the SSBs within the DMTC window at the candidate positions. These embodiments are described in more detail below.

In some embodiments, the parameter is indicated by a DCI format. In these embodiments, if the scheduled PDSCH overlaps with one of the SSBs having a candidate SSB index tin a slot and an SSB index mod(t, Q) is set to '1' in the indicator, the gNB may perform PDSCH rate matching around the SSB with candidate SSB index tin the slot. As stated above, the value 'Q' indicates the number of SSBs to be used by the UE for QCL derivation. In these embodiments, the UE would be similarly configured to perform PDSCH rate matching around the SSB with candidate SSB index tin the slot. These embodiments are described in more detail below.

In some embodiments, the parameter comprises ssb-PositionsInBurst and is configured in a SIB1. These embodiments are described in more detail below.

In some embodiments, the parameter comprises ssb-PositionsInBurst and is transmitted via UE specific RRC signalling. These embodiments are described in more detail below.

In some embodiments, the parameter is separately configured by the gNB for each configured CORESET for a bandwidth part (NWP) for a cell, These embodiments are described in more detail below.

In some embodiments, the parameter is separately configured by the gNB for each TCI state. These embodiments are described in more detail below.

In some embodiments, the gNB may perform rate matching when the scheduled PDSCH overlaps with the SSBs, and refrain from performing rate matching when the scheduled PDSCH does not overlap with the SSBs. In these embodiments, to perform rate matching, the gNB may match a number of encoded bits in a transport block to a number of bits that can be transmitted without use or resource elements (REs) of the PDSCH that overlap with the SSBs. These embodiments are described in more detail below.

In some embodiments, the gNB may encode a DCI format to include a one-bit indicator to indicate to the UE whether to perform rate matching around the SSBs when the scheduled PDSCH overlaps with the SSBs. These embodiments are described in more detail below.

In some embodiments, the gNB may transmit the DRS in consecutive time resources when the LBT is successful, the parameter encoded to indicate a consecutive SSB index. These embodiments are described in more detail below.

In some embodiments, the number of SSBs used for QCL derivation (Q) is configured by higher-layer signalling to allow the UE to derive the parameter from the value of Q. These embodiments are described in more detail below.

In some embodiments, the number of the SSBs is indicated by the parameter in a group-based manner. These embodiments are described in more detail below.

Some embodiments are directed to a user equipment (UE) configured for operation in a fifth-generation new-radio (NR) system (5GS). For unlicensed spectrum operation above 52.6 GHz, the UE may decode a parameter (e.g., ssb-PositionsInBurst) received from a generation node b (gNB) (e.g., in the SIB1 or UE specific RRC signalling). The parameter may indicate candidate positions of synchronization signal blocks (SSBs) within a discovery reference signal (DRS) measurement timing configuration (DMTC) transmission window. The UE may decode a discovery reference signal (DRS) on the unlicensed carrier. The DRS may include one or more of the SSBs transmitted by the gNB during the candidate positions that fall within the DRS (i.e., not all candidate positions, only the candidate positions that are within the DRS that is being transmitted if LBT is successful). The UE may also decode a scheduled PDSCH and perform rate matching at the UE, around the received SSBs for the scheduled PDSCH based on the indicated parameter. These embodiments are described in more detail below.

In some embodiments, the UE may perform rate matching when the scheduled PDSCH overlaps with the SSBs, and refrain from performing rate matching when the scheduled PDSCH does not overlap with the SSBs. In these embodiments, to perform rate matching, the UE may match a number of decoded bits in a transport block to a number of bits that can be transmitted without use or resource elements (REs) of the PDSCH that overlap with the SSBs. These embodiments are described in more detail below.

For a 5G system, high frequency band communication has attracted significant attention from the industry, since it can provide wider bandwidth to support the future integrated communication system. The beam forming is a critical technology for the implementation of high frequency band system due to the fact that the beam forming gain can compensate the severe path loss caused by atmospheric attenuation, improve the SNR, and enlarge the coverage area. By aligning the transmission beam to the target UE, the radiated energy is focused for higher energy efficiency, and the mutual UE interference is suppressed. The synchronization signal block (SSB) including primary synchronization signal (PSS), secondary synchronization signal (SSS) and physical broadcast channel (PBCH) are transmitted in multiple time instances, possibly with different transmit beam directions, or spatial filters. For example, the number of SSBs transmitted can be up to 64.

In NR Rel-15, a bitmap which is provided by higher layer parameter ssb-PositionsInBurst in SIB1 and ServingCellConfigCommon, is used to indicate the actually transmitted SS Block position in SS block potential position. Note that this information is used to allow UE to perform rate-matching of physical downlink shared channel (PDSCH) which are partially overlapping with SSB resource in time and frequency. When SSB overlaps with a physical downlink control channel (PDCCH) candidate at least one resource element (RE), UE is not required to monitor the PDCCH candidate.

For NR systems operating on unlicensed spectrum, discovery reference signal (DRS) is employed to facilitate fast transition of small cell from OFF state to ON state by transmitting low duty cycle signals. SSB can be a part of DRS and is transmitted to allow UEs to discover and measure the dormant cell. FIG. 1A illustrates one example of DRS transmission duration of 1 ms comprising of 2 slots (using 30 kHz subcarrier spacing (SCS)).

Note that for NR systems operating on unlicensed spectrum, the transmission of physical channels and signals, including SSB is subject to listen before talk (LBT). The gNB may not get channel occupation in a timing of an SSB. To improve the reliability for SSB transmission, there exist multiple transmission opportunities for an SSB in the DRS transmission window. For PDSCH rate matching, it should jointly consider the high layer configuration ssb-PositionsInBurst and the multiple transmission opportunities for an SSB in the DRS transmission window. For NR unlicensed operation on high frequency band, the number of SSBs can be up to e.g. 64, the enhancements on SSB rate-matching need to be considered accordingly.

For above 52.6 GHz carrier frequency with unlicensed spectrum, the number of supported SSBs could be up to N for efficient beam-based operation, e.g. N equals to 64. If listen before talk (LBT) is required before transmission on a unlicensed carrier, gNB may not always get channel occupation in a right timing of an SSB. To improve the reliability for SSB transmission, a DRS measurement timing configuration (DMTC) window is defined to provide multiple times of transmission for an SSB. Table 1 illustrates the parameters which are used for SSB time index determination. The candidate SSB index t in a DMTC window is numbered from 0 to T−1. T is the total number of candidate SSBs in the DMTC window, T≥Q. Q is the number of SSBs used for QCL derivation. The actual transmitted SSBs by a gNB is less than or equals to Q.

TABLE 1

| Parameters for SSB time index determination | |
|---|---|
| Parameter | Description |
| t | Candidate SSB index |
| c | Cycle index |
| s | PBCH-DMRS index |
| b | Beam index |
| Q | The number of SSBs used for QCL derivation |

Based on the above parameters, candidate SSB index t at the UE is determined from c and s and given by t=S*c+s, where c=0, 1, 2 is the cycle index, and s=0 . . . , S−1 is demodulation reference signal (DMRS) index for PBCH transmission. In NR system in Rel-15 and Rel-16, S equals to 8.

Further, beam index b at the UE is determined from s and Q and is given by b=mod (s, Q). This can also be written as b=mod (8*c+s, Q), if Q is a power of two. All candidate SSB index which corresponds to same beam index are QCLed.

Figure 1B:
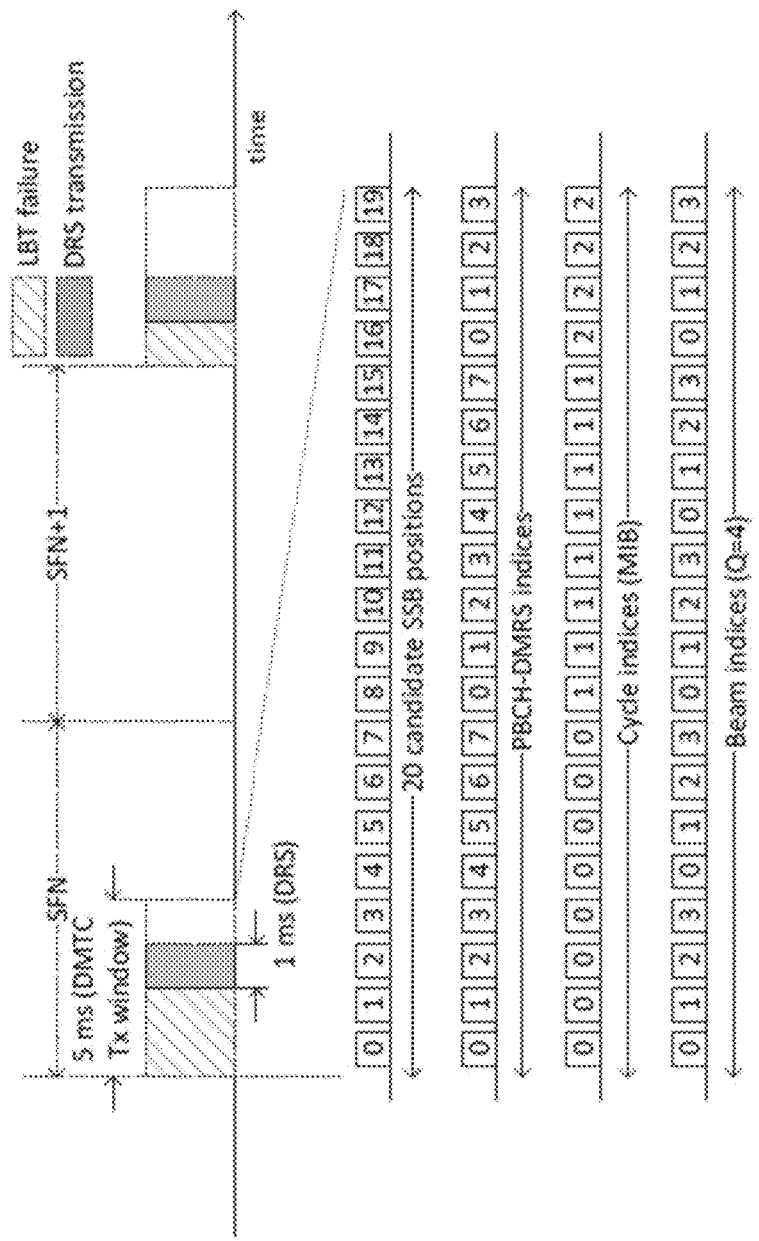
FIG. 1B illustrates a synchronization signal block (SSB) transmission in a DRS measurement timing configuration (DMTC) window in accordance with some embodiments.

FIG. 1B provides an example on the relation of above parameters referring to DRS transmission with SCS 30 kHz adopted in NR-U in Rel-16. The total number of candidate SSBs in a DRS window T equals to 20, the number of used beams Q equals to 4. The number of PBCH-DMRS indexes S equals to 8.

As mentioned above, for NR systems operating on unlicensed spectrum, the transmission of physical channels and signals, including SSB is subject to LBT. The transmission cannot be done if LBT is failed, To reduce the impact of LBT, a gNB could transmit a continuous DRS transmission which includes the SSBs after a successful LBT. Further, there are multiple opportunities of the SSBs in DRS transmission window. Depending on the transmissions of other nodes nearby, the exact start position of DRS in the DRS transmission window could be changed.

In one embodiment, assuming the number of SSBs used for QCL derivation, i.e. Q is configured by high layer signaling, the candidate values of Q could be selected considering the number of actual transmitted SSBs by gNB and the number of transmission opportunities for a SSB in the DRS transmission window.

In one option, assuming up to 64 SSBs are supported, each candidate value of Q could be power of 2, although this is not a requirement. E.g. a 2-bit signaling could indicate 4 values of Q, 8, 16, 32, 64.

In one option, assuming up to 64 SSBs are supported, a value of Q is not restricted to power of 2. This enables evenly distributed values of Q. Assuming $N_{RS}$ PBCH-DMRS indexes are used, e.g. $N_{RS}$=8, a value of Q could be integer times of $N_{RS}$. By this way, the SSBs using different PBCH-DMRS indexes must correspond to different QCL. For example, a 2-bit signaling of Q could indicate 4 values: 16, 32, 48, 64.

In one embodiment, for the rate matching of a PDSCH in a slot in the DRS transmission window, whether UE needs to assume PDSCH rate matching around a SSB which is overlapped in time and frequency with the is controlled by the indicator ssb-PositionsInBurst. ssb-PositionsInBurst could be signalled in SIB1 or UE specific RRC signalling. if ssb-PositionsInBurst is configured by UE specific signalling, it could override the ssb-PositionsInBurst configured by SIB1. Since there are multiple transmission opportunities for an SSB index b in the DRS transmission window, PDSCH rate matching may be needed in the multiple transmission opportunities if the SSB index b is indicated by ssb-PositionsInBurst. That is, for a SSB with candidate SSB index t in a slot, if the SSB index mod(t, Q) is set to '1' in the ssb-PositionsInBurst, UE could do PDSCH rate matching around the SSB if the PDSCH is overlapped with the SSB.

In one option, a single parameter ssb-PositionsInBurst could be configured by SIB1 or UE specific RRC signalling which applies to all DL transmissions.

In one option, the parameter ssb-PositionsInBurst could be separately configured for each configured CORESET for a MVP for a cell. For example, for M-TRP operation, the configured CORESETs are differentiated by one-bit indicator in the CORESET configuration. The one-bit indicator can also be used to associate with two separated configured ssb-PositionsInBurst.

In one option, the parameter ssb-PositionsInBurst could be separately configured for each TCI state. A LE derives the TCI state for a PDSCH. Then the UE can derive the ssb-PositionsInBurst for PDSCH rate matching based on the TCI state.

In another embodiment, the PDSCH rate matching around SSBs could be indicated dynamically by DCI format 1_0 and 1_1. A DCI format can schedule one or multiple PDSCHs in one or multiple consecutive slots. For a DCI format scheduling multiple PDSCHs, the number of scheduled TB could be 1 or more than 1.

In one option, a 1-bit indicator is included in the DCI format which is independent from the configured ssb-PositionsInBurst. If the 1-bit indicator is UE does rate matching around the SSB(s) in a slot when a scheduled. PDSCH overlaps with SSB(s) in time and frequency in the slot, irrespective of the configured ssb-PositionsInBurst. Otherwise, if the 1-bit indicator is '0', UE does not do PDSCH rate matching around a SSB. The above PDSCH rate matching only applies for a slot within a DRS window. Alternatively, the above PDSCH rate matching applies to any slot if bit '1' is dynamically indicated.

In one option, a 1-bit indicator is included in the DCI format and is interpreted jointly with the configured ssb-PositionsInBurst. If multiple ssb-PositionsInBurst are configured, the exact ssb-PositionsInBurst used in the rate matching is derived by the 1-bit indicator in CORESET configuration or the TCI state for the PDSCH, as provided in above embodiment. If the 1-bit indicator is '1', and if a scheduled PDSCH overlaps with a SSB with candidate SSB index t in time and frequency in a slot and the SSB index mod(t, Q) is set to '1' in the ssb-PositionsInBurst, UE does PDSCH rate matching around the SSB with candidate SSB index t in the slot. Otherwise, UE does not do PDSCH rate matching around a SSB. For the multiple PDSCHs scheduled by a same DCI format, PDSCH rate matching around an SSB is individually determined.

In one embodiment, the DRS could be transmitted on SSBs with consecutive candidate SSB index. That is, DRS could be transmitted on consecutive time resource after LBT is successful. Therefore, ssb-PositionsInBurst could be designed to indicate consecutive SSB index.

In one option, assuming overhead of X bits for ssb-PositionsInBurst, e.g. X=16, for a value of Q, i.e. $Q_k$, if $Q_k \geq X$, the $Q_k$ SSB indexes are divided into X groups for which each group is associated one of the X bits. if $Q_k < X$, the $Q_k$ SSB indexes are 1-by-1 mapped with the first $Q_k$ bits of the X bits.

In one option, assuming up to N SSBs could be transmitted by gNB, the used SSBs by a gNB could be derived by the first SSB index S and the number of consecutively transmitted SSBs L, $0 \leq S \leq N-L$, $1 \leq L \leq N$. N could be predefined or configured by high layer signaling. The size of the indicator ssb-PositionsInBurst of the used SSBs is $[\log_2(N \cdot (N+1)/2)]$. For a value of ssb-PositionsInBurst, S and L satisfy that, if $(L-1) \leq \lfloor N/2 \rfloor$ then
ssb_PositionsInBurst=N·(L−1)+S
else
ssb_PositionsInBurst=N·(N−L+1)+(N−1−S)

In one option, assuming up to N SSBs could be transmitted by gNB and the minimum number of SSBs transmitted by gNB is M, the used SSBs by a gNB could be derived by the first SSB index S and the number of consecutively transmitted SSBs L, $0 \leq S \leq N-L$, $M \leq L \leq N$. N and M could be predefined or configured by high layer signaling. Since beam-based operation is used for above 52.6 GHz carrier frequency, M is typically larger than 1. The size of the indicator ssb-PositionsInBurst of the used SSBs is $\lceil \log_2((N-M+1)\cdot(N-M+2)/2) \rceil$. For a value of ssb-PositionsInBurst, S and L satisfy that, if $(L-M) \leq \lfloor (N-M+1)/2 \rfloor$ then
ssb_PositionsInBurst=$(N-M+1)\cdot(L-M)+S$
else
ssb_PositionsInBurst=$(N-M+1)\cdot(N-L+1)+(N-M-S)$ In one option, assuming up to N SSBs could be transmitted by gNB, the used SSBs by a gNB could be derived by the first SSB index S, and the number of consecutively transmitted. SSBs L, $0 \leq S \leq N-1$, $1 \leq L \leq N$. N could be predefined or configured by high layer signaling. By allowing S up to N−1, the used SSBs could be some SSBs with largest SSB indexes followed by some SSBs with smallest SSB indexes. The size of the indicator ssb-PositionsInBurst of the used SSBs is $\lceil 2 \cdot \log_2(N) \rceil$. For a value of ssb-PositionsInBurst, S and L satisfy that ssb_PositionsInBurst=$N \cdot (L-1)+S$.

In one option, assuming up to N SSBs could be transmitted by gNB and the minimum number of SSBs transmitted by gNB is M, the used SSBs by a gNB could be derived by the first SSB index S, and the number of consecutively transmitted SSBs L, $0 \leq S \leq N-1$, $M \leq L \leq N$. N and M could be predefined or configured by high layer signaling. Since beam-based operation is used for above 52.6 GHz carrier frequency, M is typically larger than 1. The size of the indicator ssb-PositionsInBurst of the used SSBs is $\lceil \log_2(N \cdot (N-M+1)) \rceil$. For a value of ssb-PositionsInBurst, S and L satisfy that ssb_PositionsInBurst=$N \cdot (L-M)+S$.

In the above options, the overhead of ssb-PositionsInBurst could be reduced considering limitation of values of first SSB index S. For example, a duration of CCA slot may correspond to time length of two or more SSBs since the length of a slot in above 52.6 GHz is quite short. The potential start SSB index S could be $S=S_0+i\cdot n$, $n=0, 1, \ldots$ $S_0$ could be fixed to 0. Alternatively, $S_0=0, 1, \ldots Y-1$, Y is the distance of adjacent occupied candidate SSB index. Y could be determined by the slot length and the duration of CCA slot.

In one embodiment, assuming the number of SSBs used for QCL derivation, i.e. Q is configured by high layer signaling, the indicator of the used SSBs ssb-PositionsInBurst could be derived based on the signaled value Q.

In one option, the value of ssb-PositionsInBurst corresponding to a value Q could be derived by the first SSB index and the number of consecutively transmitted SSBs provided in above embodiment by setting $N=Q_k$. The size of ssb-PositionsInBurst field in high layer signaling is dimensioned by the maximum candidate value of Q, so that the field size is fixed. alternatively, the size of ssb-PositionsInBurst field in high layer signaling is determined corresponding to the signaled value $Q_k$ respectively.

In one option, ssb-PositionsInBurst of fixed size is signaled in the high layer signaling. For a value of Q up to the value of ssb-PositionsInBurst corresponding to a value Q could be derived by the first SSB index and number of consecutively transmitted SSBs provided in above embodiment by setting $N=Q_k$. On the other hand, for a value $Q_k > Q_m$, a compression scheme is applied to fit with the field size determined by value $Q_m$.

For a value $Q_k > Q_m$, the granularity of indication on transmitted SSBs could be n, n>1. For example, the indicatable value of L is $L=Q_k-i\cdot n$, $n=0, 1, \ldots$, L>0. Herein, ssb-PositionsInBurst indicates all combinations of $L=Q_k-i\cdot n$ and S. Value n is selected to make the field size not larger than the fixed field size. For example, for Q equals to 8, 16 or 32, n equals to 1, hence all potential combinations of S and L are indicatable. For Q equals to 64, the same bit size as Q=32 can be achieved by setting n=2.

Alternatively, for a value $Q_k > Q_m$, the minimum number of SSBs transmitted by gNB in the above embodiment, i.e. M is properly selected to fit with the fixed field size. For example, assuming the 4 values of Q are {8, 16, 32, 64}, ssb-PositionsInBurst in high layer signalling could be fixed to 10 bits. For Q=8, 16 or 32, ssb-PositionsInBurst can indicate all combinations of L and S. For Q=64, ssb-PositionsInBurst could be limited to 10 bits by setting $M \geq 21$.

In one embodiment, the used SSBs ssb-PositionsInBurst could be indicated in a group-based manner. Assuming up to N SSBs could be transmitted by gNB, the N SSB indexes can be divided into N/D groups. Each group consists of D consecutive SSB indexes. N and D could be predefined or configured by high layer signaling. Therefore, the used SSB indexes ssb-PositionsInBurst could be indicated by a pair of information, which includes an indicator on the consecutively used group(s) and an indicator on used SSB index(s) in a group. Denote the number of used SSB indexes in a group is d and the number of consecutively used groups is L, the total number of used SSB indexes by gNB is d·L. Specifically, the SSB indexes used by gNB could be one or multiple interlaces b=S+D·j, j=0, 1, ... L−1, S is/are the SSB index(es) in a first group used by gNB. An example on the group based SSB index indication is provided in FIG. 2, which assumes group size D equals to 2 and the first one of the two interlaces is allocated. 9 consecutive SSB indexes in the interlace are allocated starting from SSB index 6. is Such interlaced designs could be motivated by following cases, gNB needs to transmit SIB1 and other broadcast information in more time resource. Therefore, gNB transmits SIB1 and other broadcast information in all OFDM symbols between two adjacent transmitted SSBs so that DRS still occupies consecutive time resources.

gNB may intentionally leave a gap between two adjacent transmitted. SSBs. In the design on Rel-16 NR-U, a gNB can continue its DL transmission of a DL transmission burst if the gap between DL transmission is less than 16 us.

In one option, the used SSB index(s) in a group is indicated by a bitmap of length D, D is the number of SSB indexes in a group. Alternatively, the used SSB index (s) is indicated by a start SSB index and number of consecutively allocated SSB indexes. Alternatively, the used SSB index (s) is evenly staggered in the D SSB indexes in a group. Assuming $D=2^d$, the valid distance between two allocated SSB indexes is $2^0, 2^1, \ldots, 2^d$. Alternatively, a single SSB index from the D SSB indexes is indicated.

In one option, the used groups are derived by a first group index S and the number of consecutive groups L, $0 \leq S \leq N/D-L$, $1 \leq L \leq N/D$. The size of the indicator ssb-PositionsInBurst of the used groups is $\lceil \log_2(N/D \cdot (N/D+1)/2) \rceil$. Alternatively, the number of used groups is derived by a first group index S and the number of consecutive groups L, $0 \leq S \leq N/D-1$, $1 \leq L \leq N/D$. The size of the indicator ssb-PositionsInBurst of the used groups is $\lceil 2 \cdot \log_2(N/D) \rceil$. Alternatively, the number of used groups is derived by a first group index S and the number of consecutive groups L, $0 \leq S \leq N/D-L$, $M/D \leq L \leq N/D$, M is the minimum number of consecutively groups by gNB. The size of the indicator ssb-PositionsInBurst of the used groups is $\lceil \log_2((N/D-M/D+1) \cdot (N/D-M/D+2)/2) \rceil$. Alternatively, the used groups are derived by a first group index S and the number of consecutive groups L, $0 \leq S \leq N/D-1$, $M/D \leq L \leq N/D$. The size of the indicator ssb-PositionsInBurst of the used groups is $\lceil \log_2(N/D \cdot (N/D-M/D+1)) \rceil$.

For example, assuming N=64, D=2 and the 4 values of Q {8, 16, 32, 64}, the valid combination of number of SSB indexes in an group and number of groups are {1, 8}, {2, 4}, {1, 16}, {2, 8}, {1, 32}, {2, 16} and {2, 32}. For example, the number of SSB indexes in a group could be indicated by 1 bit. The number of SSB groups could be indicated by 8, 9 or 10 bits according to above alternatives.

For example, assuming N=64, ssb-PositionsInBurst is 16 bits, the 16 bits could be divided into 4 bits for SSB indexes indication in a group and 12 bits for consecutive group indication. The 12 bits are enough to indicate all possible combination of S and L for up to 64 groups. The number of SSB indexes in a group may not be fixed. The 4 bits for SSB indexes indication in a group could indicate a number of SSBs in a group D, together with an allocation pattern of the D SSB indexes in a group. Table 2 provides some example of D and allocation patterns.

TABLE 2

SSB indexes indication in a group

| Number of SSB indexes in a group, D | valid pattern |
| --- | --- |
| 1 | {1} |
| 2 | {0, 1}, {1, 0} |
| 4 | {0, 0, 0, 1}, {0, 0, 1, 0}, {0, 1, 0, 0}, {1, 0, 0, 0}, {1, 1, 0, 0}, {0, 0, 1, 1} |

Figure 2:
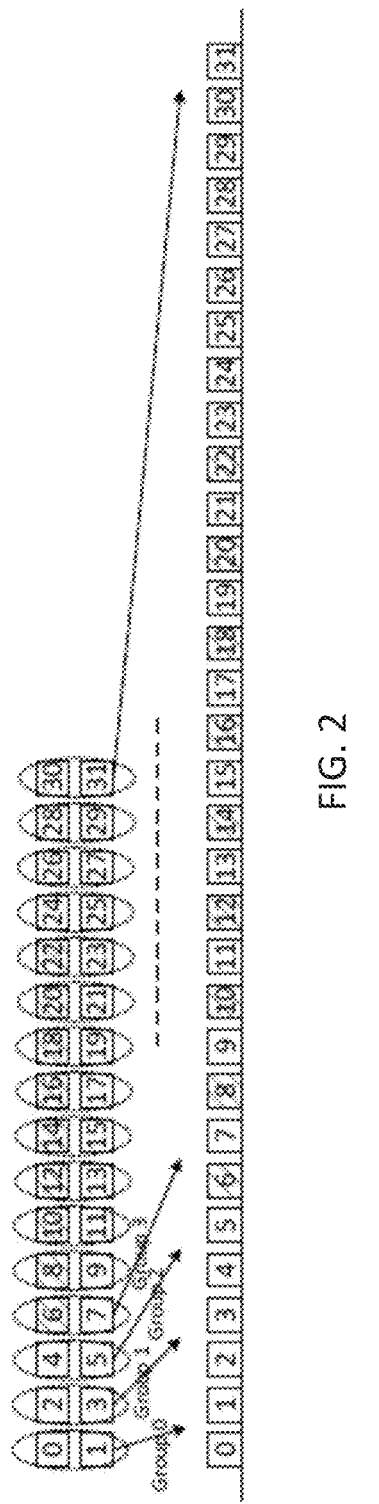
FIG. 2 illustrates interlaced SSB indexes indication in accordance with some embodiments.
Figure 3:
FIG. 3 illustrates consecutive SSB indexes indication in accordance with some embodiments.

Combining the 4 bits for SSB indexes indication in a group and the 12 bits for consecutive group indication, the used SSB indexes are determined in the Q SSB indexes for QCL derivation. If interlaced SSB indexes are to be used, as shown in FIG. 2, assuming the 4 bits indicate group size D=2 and pattern {1, 0}, i.e. only the first SSB index in a group is used, the allocated SSB indexes are all even SSB indexes from 6 to 22. On the other hand, if continuous SSB indexes are desired, the 4 bits indicate group size D=1. As shown in FIG. 3, the 12 bits indicate consecutively used SSB indexes from 6 to 23 with granularity of 1.

Figure 4:
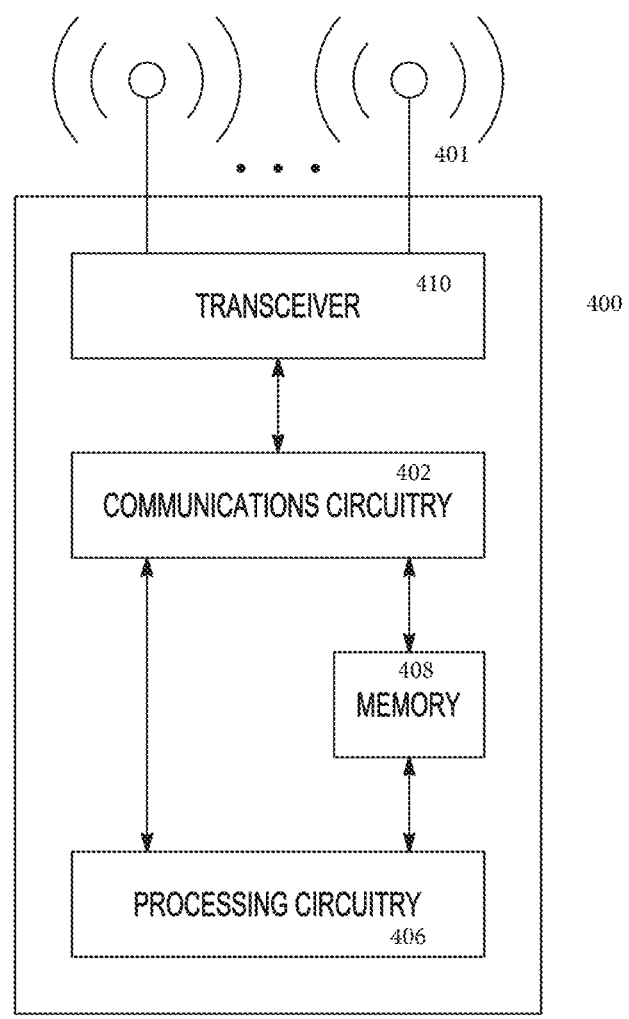
FIG. 4 illustrates a functional block diagram of a wireless device in accordance with some embodiments.

In one embodiment, FIG. 4 illustrates a functional block diagram of a communication station that may be suitable for use as a UE or gNB in accordance with some embodiments. The communication station 400 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 400 may include communications circuitry 402 and a transceiver 410 for transmitting and receiving signals to and from other communication stations using one or more antennas 401. The communications circuitry 402 may include circuitry that can operate the physical layer (PHY) communications and/or medium access control (MAC) communications for controlling access to the wireless medium, and/or any other communications layers for transmitting and receiving signals. The communication station 400 may also include processing circuitry 406 and memory 408 arranged to perform the operations described herein. In some embodiments, the communications circuitry 402 and the processing circuitry 406 may be configured to perform operations detailed in the above figures, diagrams, and flows.

In accordance with some embodiments, the communications circuitry 402 may be arranged to contend for a wireless medium and configure frames or packets for communicating over the wireless medium. The communications circuitry 402 may be arranged to transmit and receive signals. The communications circuitry 402 may also include circuitry for modulation/demodulation, upconversion/downconversion, filtering, amplification, etc. In some embodiments, the processing circuitry 406 of the communication station 400 may include one or more processors. In other embodiments, two or more antennas 401 may be coupled to the communications circuitry 402 arranged for sending and receiving signals. The memory 408 may store information for configuring the processing circuitry 406 to perform operations for configuring and transmitting message frames and performing the various operations described herein. The memory 408 may include any type of memory, including non-transitory memory, for storing information in a form readable by a machine (e.g., a computer). For example, the memory 408 may include a computer-readable storage device, read-only memory (ROM), random-access memory (RAM), magnetic disk storage media, optical storage media, flash-memory devices and other storage devices and media.

In some embodiments, the communication station 400 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 400 may include one or more antennas 401. The antennas 401 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 400 may include one or more of a keyboard, a display, a non-volatile memory port, multiple antennas, a graphics processor, an application processor, speakers, and other mobile device elements, The display may be an LCD screen including a touch screen.

Although the communication station 400 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 400 may refer to one or more processes operating on one or more processing elements.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a generation node B (gNB) configured for operation in a fifth-generation new-radio (NR) system (5GS), the apparatus comprising:
   processing circuitry; and memory,
   wherein for unlicensed spectrum operation above 52.6 GHz, the processing circuitry is configured to:
   encode a parameter for transmission to a user equipment (UE), the parameter to indicate candidate positions of synchronization signal blocks (SSBs) within a discovery reference signal (DRS) measurement timing configuration (DMTC) transmission window;
   during the DMTC window, perform a listen-before-talk (LBT) procedure on an unlicensed carrier of the unlicensed spectrum to determine if the unlicensed carrier is available;
   when the LBT is successful, encode a discovery reference signal (DRS) for transmission on the unlicensed carrier, the DRS to include one or more of the SSBs transmitted during the candidate positions that fall within the DRS; and
   perform rate matching around the SSBs for a scheduled physical downlink shared channel (PDSCH) based on the indicated parameter and transmit a rate-matched PDSCH,
   wherein the parameter comprises ssb-PositionsInBurst and is indicated in a downlink control information (DCI) format that is transmitted to the UE prior to the DMTC transmission window.

2. An apparatus of a generation node B (gNB) configured for operation in a fifth-generation new-radio (NR) system (5GS), the apparatus comprising:
   processing circuitry; and memory,
   wherein for unlicensed spectrum operation above 52.6 GHz, the processing circuitry is configured to:
   encode a parameter for transmission to a user equipment (UE), the parameter to indicate candidate positions of synchronization signal blocks (SSBs) within a discovery reference signal (DRS) measurement timing configuration (DMTC) transmission window;
   during the DMTC transmission window, perform a listen-before-talk (LBT) procedure on an unlicensed carrier of the unlicensed spectrum to determine if the unlicensed carrier is available;
   when the LBT is successful, encode a discovery reference signal (DRS) for transmission on the unlicensed carrier, the DRS to include one or more of the SSBs transmitted during the candidate positions that fall within the DRS; and
   perform rate matching around the SSBs for a scheduled physical downlink shared channel (PDSCH) based on the indicated parameter and transmit a rate-matched PDSCH,
   wherein the SSBs include a primary synchronization signal (PSS), a secondary synchronization signal (SSS) and a physical broadcast channel (PBCH), the PSS, the SSS and the PBCH to allow the UE to detect the SSBs for synchronization with the gNB and determine parameters for SSB time index determination, and
   wherein the parameters for SSB time index determination include: a candidate SSB index (t); a cycle index (c); a PBCH-DMRS index (s); a beam index (b); and a number of SSBs used for quasi-colocation (QCL) derivation (Q).

3. The apparatus of claim 2, wherein when the LBT is not successful, the processing circuitry is to configure the gNB to refrain from transmitting the DRS on the unlicensed carrier within the DMTC transmission window.

4. The apparatus of claim 3 wherein the parameter is indicated by a DCI format, and wherein if the scheduled PDSCH overlaps with one of the SSBs having a candidate SSB index t in a slot and an SSB index mod(t, Q) is set to '1' in the indicator, the processing circuitry is to configure the gNB to perform PDSCH rate matching around the SSBs with candidate SSB index t in the slot.

5. The apparatus of claim 3, wherein the parameter comprises ssb-PositionsInBurst and is configured in a SIB 1.

6. The apparatus of claim 3, wherein the parameter comprises ssb-PositionsInBurst and is transmitted via UE specific RRC signalling.

7. The apparatus of claim 3, wherein the parameter is separately configured by the gNB for each configured CORESET for a bandwidth part (BWP) for a cell.

8. The apparatus of claim 3, wherein the parameter is separately configured by the gNB for each TCI state.

9. The apparatus of claim 3, wherein the processing circuitry is configured to perform rate matching when the scheduled PDSCH overlaps with the SSBs, and refrain from performing rate matching when the scheduled PDSCH does not overlap with the SSBs,
   wherein to perform rate matching, the processing circuitry is to match a number of encoded bits in a transport block to a number of bits that can be transmitted without use or resource elements (REs) of the PDSCH that overlap with the SSBs.

10. The apparatus of claim 9, wherein the processing circuitry is configured to encode a DCI format to include a one-bit indicator to indicate to the UE whether to perform rate matching around the SSBs when the scheduled PDSCH overlaps with the SSBs.

11. The apparatus of claim 3, wherein the processing circuitry is to cause the gNB to transmit the DRS in consecutive time resources when the LBT is successful, the parameter encoded to indicate a consecutive SSB index.

12. The apparatus of claim 3, wherein the number of SSBs used for QCL derivation is configured by higher-layer signalling to allow the UE to derive the parameter from a value of Q.

13. The apparatus of claim 3, wherein a number of the SSBs is indicated by the parameter in a group-based manner.

14. A non-transitory computer-readable storage medium that stores instructions for execution by processing circuitry of generation node B (gNB) configured for operation in a fifth-generation new-radio (NR) system (5GS), wherein for unlicensed spectrum operation above 52.6 GHz, the processing circuitry is configured to:
   encode a parameter for transmission to a user equipment (UE), the parameter to indicate candidate positions of synchronization signal blocks (SSBs) within a discovery reference signal (DRS) measurement timing configuration (DMTC) transmission window;
   during the DMTC transmission window, perform a listen-before-talk (LBT) procedure on an unlicensed carrier of the unlicensed spectrum to determine if the unlicensed carrier is available;

when the LBT is successful, encode a discovery reference signal (DRS) for transmission on the unlicensed carrier, the DRS to include one or more of the SSBs transmitted during the candidate positions that fall within the DRS; and perform rate matching around the SSBs for a scheduled PDSCH based on the indicated parameter and transmit a rate-matched PDSCH, wherein the parameter comprises ssb-PositionsInBurst and is indicated in a downlink control information (DCI) format that is transmitted to the UE prior to the DMTC transmission window.

15. The non-transitory computer-readable storage medium of claim 14, wherein the processing circuitry is configured to perform rate matching when the scheduled PDSCH overlaps with the SSBs, and refrain from performing rate matching when the scheduled PDSCH does not overlap with the SSBs, wherein to perform rate matching, the processing circuitry is to match a number of encoded bits in a transport block to a number of bits that can be transmitted without use or resource elements (REs) of the PDSCH that overlap with the SSBs.

16. The non-transitory computer-readable storage medium of claim 15, wherein the SSBs include a primary synchronization signal (PSS), a secondary synchronization signal (SSS) and a physical broadcast channel (PBCH), the PSS, the SSS and the PBCH to allow the UE to detect the SSBs for synchronization with the gNB and determine parameters for SSB time index determination, wherein the parameters for SSB time index determination include: a candidate SSB index (t); a cycle index (c); a PBCH-DMRS index (s); a beam index (b); and a number of SSBs used for quasi-colocation (QCL) derivation (Q).

17. An apparatus of a user equipment (UE) configured for operation in a fifth-generation new-radio (NR) system (5GS), the apparatus comprising:

processing circuitry; and memory, wherein for unlicensed spectrum operation above 52.6 GHz, the processing circuitry is configured to:

decode a parameter received from a generation node B (gNB), the parameter to indicate candidate positions of synchronization signal blocks (SSBs) within a discovery reference signal (DRS) measurement timing configuration (DMTC) transmission window; and decode a discovery reference signal (DRS) on an unlicensed carrier, the DRS to include one or more of the SSBs transmitted by the gNB during the candidate positions that fall within the DRS; and decode a scheduled PDSCH and perform rate matching at the UE around the received SSBs for the scheduled PDSCH based on the indicated parameter, wherein the processing circuitry is configured to cause the UE to perform rate matching when the scheduled PDSCH overlaps with the SSBs, and refrain from performing rate matching when the scheduled PDSCH does not overlap with the SSBs, wherein to perform rate matching, the processing circuitry is to match a number of decoded bits in a transport block to a number of bits that can be transmitted without use or resource elements (REs) of the PDSCH that overlap with the SSBs.

18. The apparatus of claim 17, wherein the SSBs include a primary synchronization signal (PSS), a secondary synchronization signal (SSS) and a physical broadcast channel (PBCH), the PSS, the SSS and the PBCH to allow the UE to detect the SSBs for synchronization with the gNB and determine parameters for SSB time index determination, wherein the parameters for SSB time index determination include: a candidate SSB index (t); a cycle index (c); a PBCH-DMRS index (s); a beam index (b); and a number of SSBs used for quasi-colocation (QCL) derivation (Q).

19. The apparatus of claim 18, wherein the parameter is indicated by a DCI format, and wherein if the scheduled PDSCH overlaps with one of the SSBs having a candidate SSB index t in a slot and an SSB index mod(t, Q) is set to '1' in the indicator, the processing circuitry is to configure the UE to perform PDSCH rate matching around the SSBs with candidate SSB index t in the slot.

* * * * *